United States Patent

Krawiec

[15] 3,664,924
[45] May 23, 1972

[54] NUCLEAR REACTOR SPRING FERRULE SPACER GRID

[72] Inventor: Donald M. Krawiec, Thompsonville, Conn.

[73] Assignee: Combustion Engineering, Inc., Windsor, Conn.

[22] Filed: June 24, 1968

[21] Appl. No.: 748,149

[52] U.S. Cl. .................................................176/78, 176/73
[51] Int. Cl. ...........................................................G21c 3/34
[58] Field of Search ...................................176/76, 78, 87, 73

[56] References Cited

UNITED STATES PATENTS

| | | | |
|---|---|---|---|
| 3,255,090 | 6/1966 | Leirvits.....................................176/76 |
| 3,298,922 | 1/1967 | Prince et al. ..........................176/76 X |
| 3,301,764 | 1/1967 | Timbs et al. ..........................176/76 X |
| 3,301,765 | 1/1967 | Eyre et al..............................176/76 X |
| 3,379,617 | 4/1968 | Andrews et al. ......................176/76 X |
| 3,380,890 | 4/1968 | Glandin et al. ............................176/78 |
| 3,398,053 | 8/1968 | Huber et al................................176/78 |
| 3,405,033 | 10/1968 | Widell et al...............................176/78 |
| 3,442,763 | 5/1969 | Chetter et al.............................176/78 |

Primary Examiner—Benjamin R. Padgett
Assistant Examiner—Gary G. Solyst
Attorney—Fishman and Van Kirk

[57] ABSTRACT

A bimetallic spacer grid for nuclear reactors comprising a plurality of spacer elements and spring ferrules which are mated to form the grid assembly. The spacer elements are comprised of a material having a characteristic low neutron capture cross section and are formed with outwardly extending arches while the spring ferrules are formed from a material which has better stress relaxation qualities than the material employed for the spacer elements and which will thus not suffer a substantial decrease in resiliency due to prolonged exposure to intensive radiation. The spring ferrules and spacer element arches cooperate to support each fuel element at five points of contact.

14 Claims, 8 Drawing Figures

INVENTOR
DONALD M. KRAWIEC

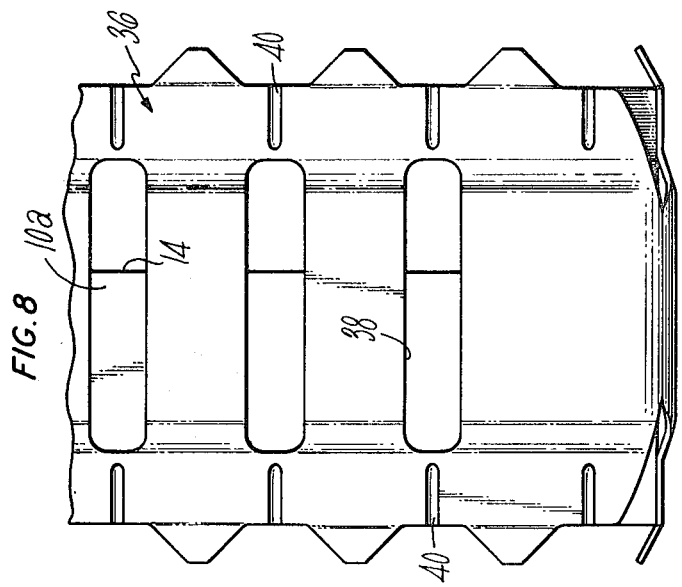
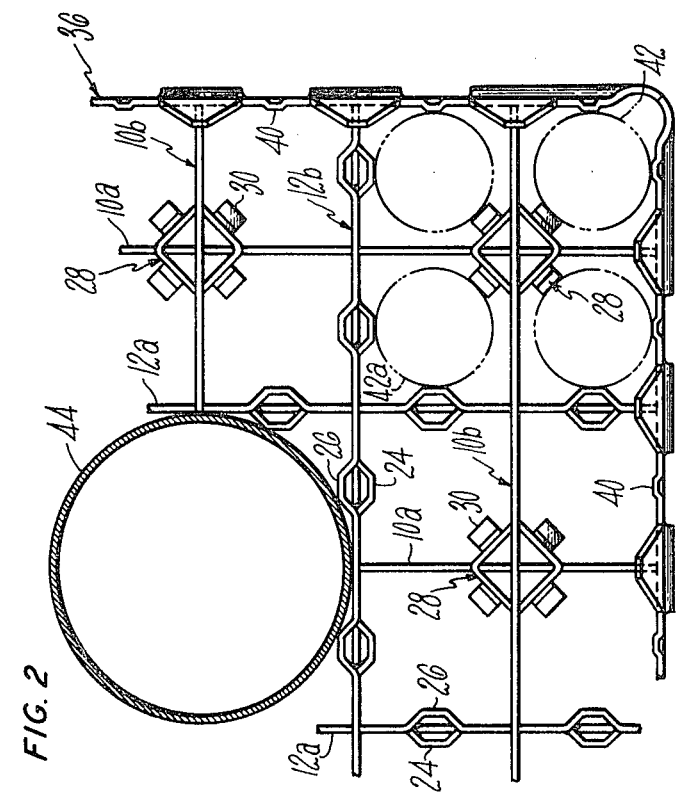
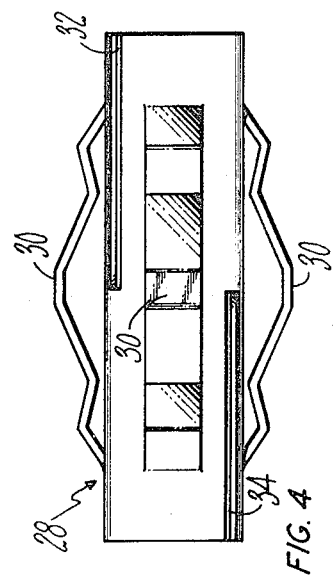
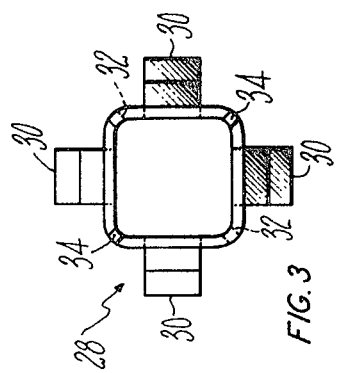

NUCLEAR REACTOR SPRING FERRULE SPACER GRID

BACKGROUND OF THE INVENTION

1. Field of the Invention

The present invention relates to the supporting of fuel elements within a nuclear reactor. More particularly, the present invention relates to fuel assembly spacer grids for use in a reactor. Accordingly, the general objects of the present invention are to provide novel and improved methods and apparatus of such character.

2. Description of the Prior Art

As is well known, there are a number of considerations which must be observed in designing apparatus for supporting fuel elements within a nuclear reactor. For example, the supporting structure must be so constituted as to permit flow of a heat exchange fluid over the fuel elements in order to prevent overheating and possible rupture of the fuel element claddings and release of the radioactive material into the reactor and coolant stream. Thus, the points of contact between the supporting structure and the fuel elements should be minimized. Further, since stresses are produced during the operation of a reactor, the fuel element support structure must also prevent vibration of the elements; the frictional erosion which is coincident with such vibration ultimately causing structural failure of the fuel element cladding. Fuel element spacer support structure is also preferably comprised of a material having a low neutron capture cross section; use of such material obviously being in the interest of increasing overall reactor efficiency. Since the spacer grid must be initially loaded and thereafter recharged with new fuel rods, ease of loading and elimination of the possibility of jamming or binding during movement of the fuel is another design criteria.

In the prior art, spacer grid assemblies for the supporting of nuclear fuel elements within a reactor have typically been formed entirely of zircaloy, a zirconium alloy. Use of zircaloy has been dictated by its desirable combination of mechanical strength and low neutron capture cross section. As noted above, it is necessary that the fuel elements be supported in such a manner that vibration with its resulting mechanical wear will be eliminated. In the prior art, in order to achieve such fuel element restraint, spring members also comprised of zircaloy have been incorporated into the assembly structure. These spring elements have either been separate members comprised of zircaloy or have been formed by suitably stamping out sections of the spacer grid elements. A problem has, however, arisen in that the resiliency of zircaloy is adversely affected by prolonged exposure to intensive radiation. Thus, fuel element spacer grid assemblies formed entirely of zircaloy are presently viewed with some suspicion.

In order to achieve restraint by means of a material which will not be adversely affected by the environment, it has also been proposed to fabricate spacer grid assemblies entirely of Inconel. While the resiliency of Inconel will not be adversely affected by prolonged exposure to intense radiation to the extent exhibited by zircaloy, the use of Inconel or equivalent materials carries with it the penalty of a substantial decrease in reactor efficiency due to the comparatively high capture cross section of such materials.

SUMMARY OF THE INVENTION

The present invention overcomes the above and other disadvantages of the prior art by providing a novel, bimetallic spacer grid assembly for supporting fuel elements within a nuclear reactor. The present invention comprises a plurality of spacer elements which are formed from zircaloy and a plurality of spring ferrules which will preferably be formed from Inconel. The spacer elements are provided with slots so as to permit the elements to be interleaved into a grid structure. Certain of the spacer elements are also provided with outwardly extending arches, there being two arches extending outwardly from two of the sides which define each opening in the grid structure. The spring ferrules will typically be of generally square cross section and will have springs extending outwardly from each of the sides thereof. These spring members will be formed by suitably stamping out the element which is formed into the spring ferrules. When fuel elements are inserted into the spacer grid assembly, the elements will be supported by four arches and one spring member. Accordingly, the fuel elements will be supported at five points and will be maintained in position and held against vibration by a resilient member which will not be substantially adversely affected by intense radiation.

BRIEF DESCRIPTION OF THE DRAWING

The present invention may be better understood and its numerous advantages will become apparent to those skilled in the art by reference by the accompanying drawing wherein like reference numerals refer to like elements in the various figures and in which:

FIG. 2 is a partial top plan view of the spacer grid assembly of FIG 1 as positioned in a reactor.

FIG. 3 is a top view of a spring ferrule suitable for use in the grid assembly of FIGS. 1 and 2.

FIG. 4 is a side elevation view of the spring ferrule of FIG. 3.

FIG. 8 is a partial side view of a perimeter element which cooperates with the spacer elements of FIGS. 5 and 6 to define the outer perimeter of the spacer grid assembly.

DESCRIPTION OF THE PREFERRED EMBODIMENT

Figure 5:
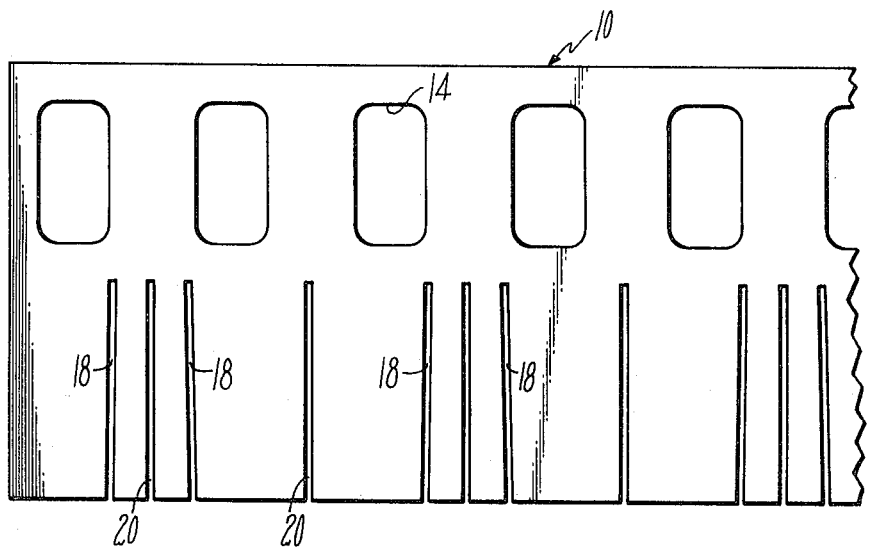
FIG 5 is a partial side elevation view of a first form of spacer element designed for use in the spacer grid assembly of FIGS. 1 and 2.
Figure 7:
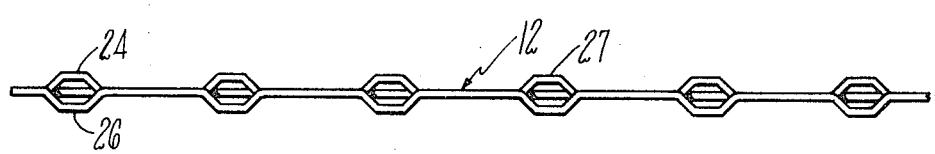
FIG. 7 is an end view of the spacer element of FIG. 6.

In the fabrication of a spacer grid in accordance with the present invention, two different forms of spacer element will be produced by stamping or otherwise machining sheets of zircaloy. The spacer elements, which may for convenience be called the "bottom" and "top" spacers, are partially shown in FIGS. 5 and 6. A "top" spacer element is indicated generally at 10 in FIG. 5 and also in FIGS. 1 and 2. A "bottom" spacer element is indicated generally at 12 in FIGS. 6 and 7 and also in FIGS. 1 and 2. Spacer elements 10 and 12 are respectively provided with cutouts 14 and 16 to reduce the mass of the grid assembly, thereby increasing reactor efficiency, and to both save on the relatively expensive zircaloy material and to enhance the exposure of the fuel elements to coolant flow.

The "top" spacer elements 10 are provided with slots 18 and 20 which extend inwardly from a first edge thereof. Slots 18—18 are inwardly tapered and are designed to accept the spring ferrule members whereas slots 20 will engage transversely oriented spacer elements when the spacer grid is assembled.

Figure 6:
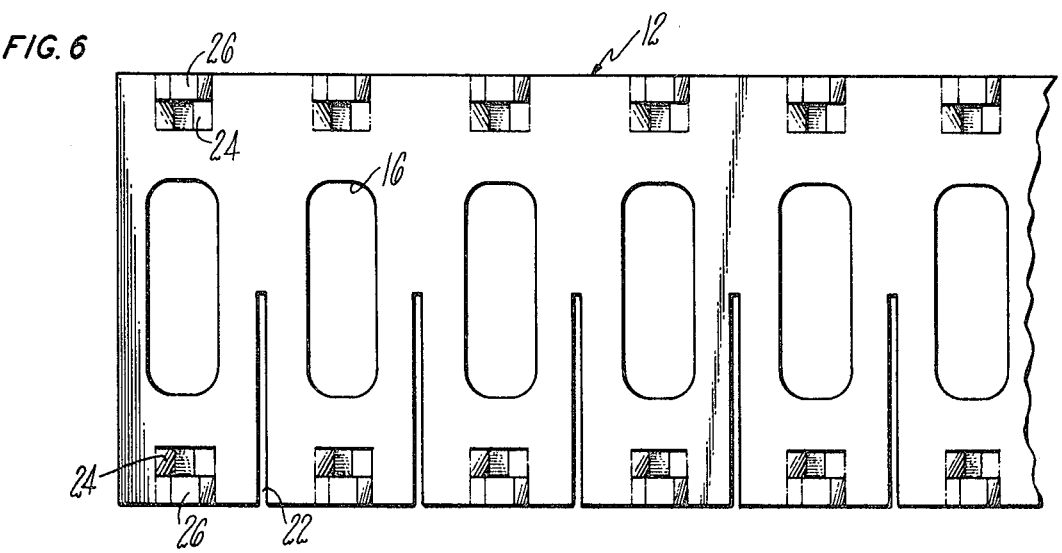
FIG. 6 is a partial side elevation view of the second form of spacer element employed in the spacer grid assembly of FIGS. 1 and 2, the spacer element of FIG. 6 cooperating with the spacer element of FIG. 5 to define the grid structure.

As may be seen from FIG. 6, the "bottom" spacer elements 12 are provided with slots 22 which engage transversely oriented spacer elements when the grid is assembled. Between the slots 22 in "bottom" spacer elements 12 and adjacent both the slotted and opposite edges thereof, the "bottom" spacers are stamped so as to provide pairs of outwardly extending arches 24—24 and 26—26. These arches may best be seen from a simultaneous consideration of FIGS. 1 and 7, the arches 24—24 extending outwardly from one side of the spacer element and the arches 26—26 extending outwardly from the spacer element in the opposite direction. As will be described below in the discussion of FIG. 2, the arches will contact and thus partially support the fuel elements which are inserted into the spacer grid after its assembly. It is to be particularly noted that the arches are formed so as to have rounded crowns 27 whereby point contact with the fuel elements will result.

The spring ferrule elements 28 which, in the manner to be described below, are inserted on the spacer elements in the course of assembly of the grid may best be seen from FIGS. 3 and 4. The ferrules will preferably be fabricated from Inconel, an alloy comprising 15 percent chromium, 77 percent nickel and 7 percent iron. While it is desired that the material from which the ferrules are fabricated have as low a neutron capture cross section as possible, the ferrules must also be comprised of a material which will have good long term stress relaxation qualities and which will accordingly not suffer a substantial degradation in resiliency under prolonged exposure to intense radiation. The ferrules can be manufactured from square tubing stock. Alternatively, the ferrules may be fabricated from flat stock which would first be stamped out to provide the outwardly extending spring members 30—30. Thereafter, a plurality of slots 32—32 and 34—34 respectively extending inwardly from opposite edges of the flat stock will be formed. The flat stock will thereafter be bent into the square shape, the bending being accomplished so as to place the slots 32—32 and 34—34 at the corners of the ferrule and to place the springs 30 at the sides of the ferrule. Fabrication of the ferrule will thereafter be completed by brazing or welding the stock where it meets on itself after bending. It is to be noted that the ferrules are not as high as the spacer elements, the size of the ferrules being held to a minimum in the interest of efficiency since the material from which the ferrules are fabricated will have a relatively high capture cross section. In a typical example, the ferrules were seven-eighths inches high whereas the "bottom" and "top" spacers are inches high. It should also be noted that the spring members 30, at their outermost points which will be in contact with the fuel elements are also slightly rounded to provide a crown. Accordingly, there will be point contact between each of springs 30 and the fuel element which it retains in the spacer grid assembly.

The perimeter strip, indicated generally at 36 in FIG. 8, will also be formed from zircaloy and will be provided with cutouts 38. In addition, the perimeter strip 36 will have pairs of oppositely disposed dimples 40—40 which extend towards the inside of the spacer grid when assembled. The dimples 40 in the perimeter strip are, in essence, small arches. The perimeter strips are designed with outwardly extending, curved sections, formed by stamping, which prevent hang-up of succeeding fuel assemblies on one another during fueling of the reactor.

Figure 1:
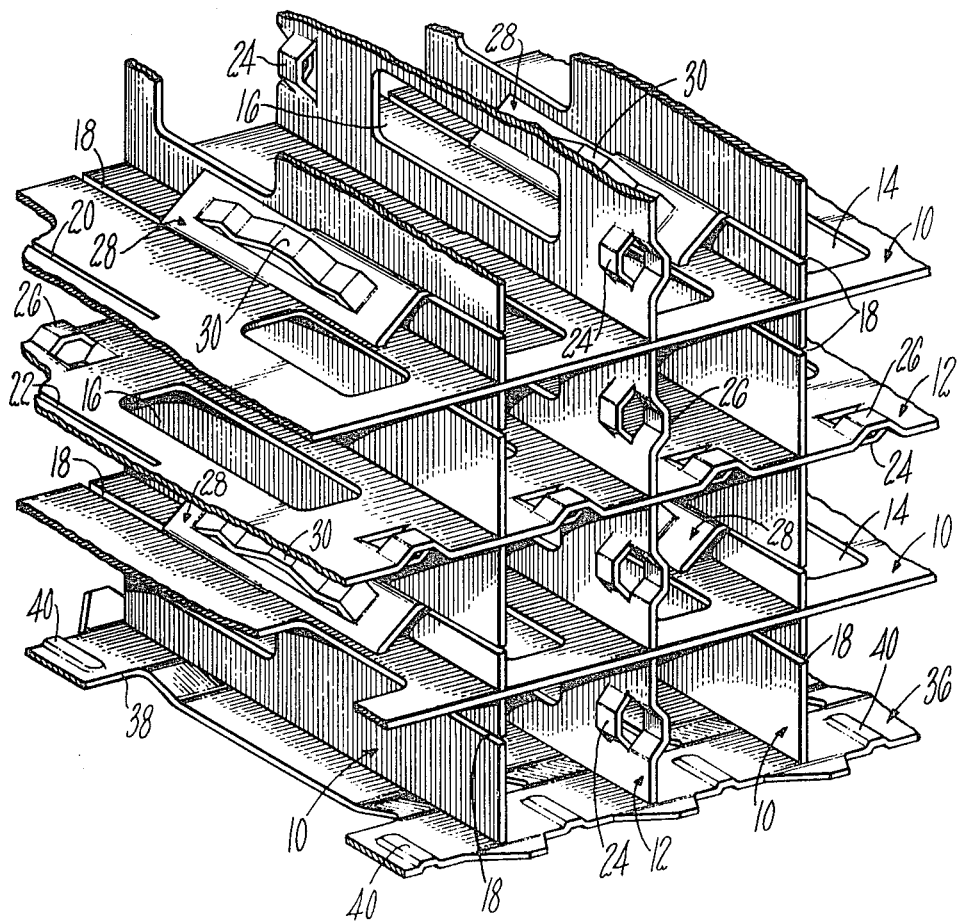
FIG. 1 is a partial, isometric view of a spacer grid assembly in accordance with the present invention.

Referring now to FIGS. 1 and 2, the assembly of the spacer grid of the present invention will be described. The initial step in the assembly is to provide a fixture which will support, in an upright position, a plurality of "bottom" and "top" spacer elements. Alternate "bottom" and "top" spacer elements 12 and 10 will be arranged in the fixture in parallel relationship to one another. Considering FIG. 2, which is a top view of the complete assembly with fuel elements indicated generally at 42, alternate "bottom" spacer elements 12a and "top" spacer elements 10a will be arranged in the fixture. As fixtured, the slots in the "top" and "bottom" spacer elements will be facing upwardly. Next, the ferrules 28 will be inserted into the upwardly extending slots 18 in the "top" spacer elements 10a as shown. When positioned on the "top" spacer elements 10a, the corner slots 32 of the ferrules 28 will be facing downwardly and will engage the tapered slots 18—18 in the "top" spacer elements. Thereafter, "bottom" and "top" spacer elements 12b and 10b will be added. Spacer elements 10b and 12b will, of course, be parallel to one another and will extend transversely of the lower (previously fixtured) spacer elements 10a and 12a. The slots 18—18 in transverse "top" spacer elements 10b will engage slots 34 in the free or upwardly extending end of the ferrules 28 and thus the ferrules will be completely trapped vertically. The tapering of slots 18 in the spacer elements 10 insures a tight fit and thus prevents fretting and guards against the springs 30 being loose and not functioning as resilient retaining members. Alternate slots 20 in transverse "top" spacer elements 10b will engage slots 22 in the spacer elements 12a and slots 20 in spacer elements 10a.

Similarly, the slots 22 in transverse "bottom" spacer elements 12b will extend downwardly and will engage alternate slots 20 of "top" spacer elements 10a and slots 22 in spacer elements 12a.

After assembly of the grid structure in the manner described above, the perimeter strips 36, a plurality of which will be employed, will be fixtured against the free ends of the spacer elements and will be welded thereto to complete the assembly. The spacer elements will also be welded at the points of intersection to insure a rigid assembly. When the assembly has been completed the fuel elements 42 may be inserted therein. As may be seen from simultaneous consideration of FIGS. 1 and 2, the interior fuel elements, that is those not adjacent a perimeter strip 36 such as element 42a, will each be held at five points. These five points will correspond to the spring 30 and the crowns on two pair of arches 24—24 and 26—26. The fuel elements 42 adjacent a perimeter strip 36 will also be held at five points, one point of contact being provided by a pair of dimples 40 and, with the exception of the corner elements, by a pair of spacer element arches.

It is to be noted that provision for internal control rods has been made in the spacer grid assembly as shown in FIG. 2. To accomplish the foregoing, certain of the spacer elements are discontinuous thereby permitting insertion of control rod tube 44. The adjacent spacer elements will be welded to tube 44 at the points of intersection of spacer elements.

From the foregoing description, it may be seen that a new and improved bimetallic, fuel assembly spacer grid has been provided by the present invention. The spacer grid assembly of the present invention consists primarily of zircaloy spacer elements and employs spring ferrules fabricated from a material having better stress relaxation qualities than zircaloy. The ferrules are placed at every other intersection of the zircaloy spacer grid such that the ferrule springs force the fuel elements up against the two opposing sides of the grid compartments. A pair of arches is formed in each of these two opposing sides of each grid compartment, one arch being adjacent the top and one adjacent the bottom of the assembly and the arches are bowed outwardly. The foregoing structure results in five-point contact with each fuel element. Due to the provision of tapered slots 18—18 in the "top" spacer elements, the ferrules will both be trapped vertically and held tightly. Accordingly, there is no necessity for attempting to weld or otherwise join the ferrule material to the zircaloy grid defining members; the welding of zircaloy to other materials being virtually impossible and having previously prevented the use of bimetallic spacer grids.

As will now be obvious to those skilled in the art, the spacer grid assembly of the present invention achieves the desirable use of radiation resistant spring members while maximizing the use of low capture cross section zircaloy material. Also, the design of the present spacer grid results in minimum resistance to coolant flow and facilitates loading and unloading of fuel elements.

While a preferred embodiment has been shown and described, various modifications and substitutions may be made thereto without departing from the spirit and scope of the present invention. Accordingly, it is to be understood that the present invention has been described by way of illustration and not limitation.

I claim:
1. A fuel assembly spacer grid for a nuclear reactor comprising:
a first plurality of spaced apart spacer elements, said spacer elements having engagement slots for engagement with a second plurality of spacer elements, and at least some of said first plurality of spacer elements having ferrule receiving slots extending inwardly from one edge thereof;
a second plurality of spaced apart spacer elements, said spacer elements of said second plurality having engagement slots for engagement with said first plurality of spacer elements, and at least some of said second plurality of spacer elements having ferrule receiving slots ex- tending inwardly from an edge thereof removed from said one edge of said first spacer elements;

said first and second pluralities of spacer elements being arranged in transverse planes and intersecting and cooperating to define a grid assembly having compartments;

a plurality of ferrules, each of said ferrules being engaged by ferrule receiving slots of a pair of intersecting spacer elements and having spacer engaging slots extending in opposite directions from the ends of the ferrules and engaging said pair of intersecting spacer elements, each of said ferrules extending into a plurality of adjacent compartments between intersecting spacer elements; and a plurality of spring elements extending from and integral with each of said ferrules, said spring elements on each ferrule extending into a plurality of adjacent compartments.

2. A fuel assembly spacer grid as in claim 1 wherein:

said ferrules are tubular members having first and second ends; and wherein said spacer engaging slots on each ferrule include a first pair of oppositely disposed slots extending inwardly from the first end of a ferrule, and a second pair of oppositely disposed slots extending inwardly from the second end of a ferrule, said first and second pairs of slots being in transversely oriented planes, said first pair of slots engaging a spacer element of said first plurality of spacer elements, and said second pair of slots engaging a spacer element of said second plurality of spacer elements.

3. A fuel assembly spacer grid as in claim 2 wherein:

the spacer elements of the first and second pluralities of spacer elements are in mutually perpendicular planes; and wherein said first and second pairs of spacer engaging slots are in mutually perpendicular planes.

4. A fuel assembly spacer grid as in claim 1 wherein:

said ferrules are captured between the edges of said spacer elements; and wherein said spring elements are two pair of oppositely disposed springs on each ferrule integral with each ferrule.

5. A fuel assembly spacer grid as in claim 1 including:

arches on at least some of said spacer elements, said arches extending into said compartments, said spring elements and said arches cooperating to support fuel elements inserted into said compartments.

6. A fuel assembly spacer grid as in claim 1 wherein:

at least some of said ferrule receiving slots in said spacer elements are inwardly tapered.

7. A fuel assembly spacer grid as in claim 1 wherein:

said spacer elements are formed of a first material having low neutron capture cross section; and wherein said ferrules are formed of a second material having better stress relaxation qualities than said first material.

8. A fuel assembly spacer grid as in claim 7 wherein:

said first material is a zirconium alloy and said second material is a nickel alloy.

9. A fuel assembly spacer grid for a nuclear reactor comprising:

a first plurality of alternate first and second spacer elements in a parallel and spaced apart relationship;

a second plurality of alternate first and second spacer elements in a parallel and spaced apart relationship, said second plurality of spacer elements being oriented perpendicularly to said first plurality of spacer elements;

said first and second spacer elements having spacer engaging slots for engagement of said spacer elements, said spacer elements intersecting and cooperating to define a grid assembly having compartments;

said first spacer elements of said assembly having first and second opposed edges, said first spacer elements of said first plurality having ferrule receiving slots extending inwardly from the first edge thereof, and said first spacer elements of said second plurality having ferrule receiving slots extending inwardly from the second edge thereof;

a plurality of tubular ferrules, each ferrule having first and second opposed pairs of spacer engaging slots arrayed in mutually perpendicular planes and extending from opposite ends of the ferrule toward the center, each ferrule engaging a pair of intersecting first spacer elements and being engaged by ferrule receiving slots of the spacer elements, each of said ferrules extending into four adjacent compartments about the pair of intersecting first spacer elements; and a plurality of spring elements extending from and integral with each of said ferrules extending into said four adjacent compartments.

10. A fuel assembly spacer grid as in claim 9 wherein: said ferrules are captured between the opposed edges of said first spacer elements.

11. A fuel assembly spacer grid as in claim 9 including:

arches on said second spacer elements, said arches extending into said compartments, said spring elements and said arches cooperating to support fuel elements inserted into said compartments.

12. A fuel assembly spacer grid as in claim 9 wherein:

at least some of said ferrule receiving slots in said spacer elements are inwardly tapered.

13. A fuel assembly spacer grid as in claim 9 wherein:

said spacer elements are formed of a first material having low neutron capture cross section; and wherein said ferrules are formed of a second material having better stress relaxation qualities than said first material.

14. A fuel assembly spacer grid as in claim 9 wherein:

said first material is a zirconium alloy and said second material is a nickel alloy.

* * * * *